May 28, 1957  C. W. MAGNAT, JR  2,793,730
CLUTCH THROW-OUT MECHANISM
Filed Nov. 12, 1953  3 Sheets-Sheet 1
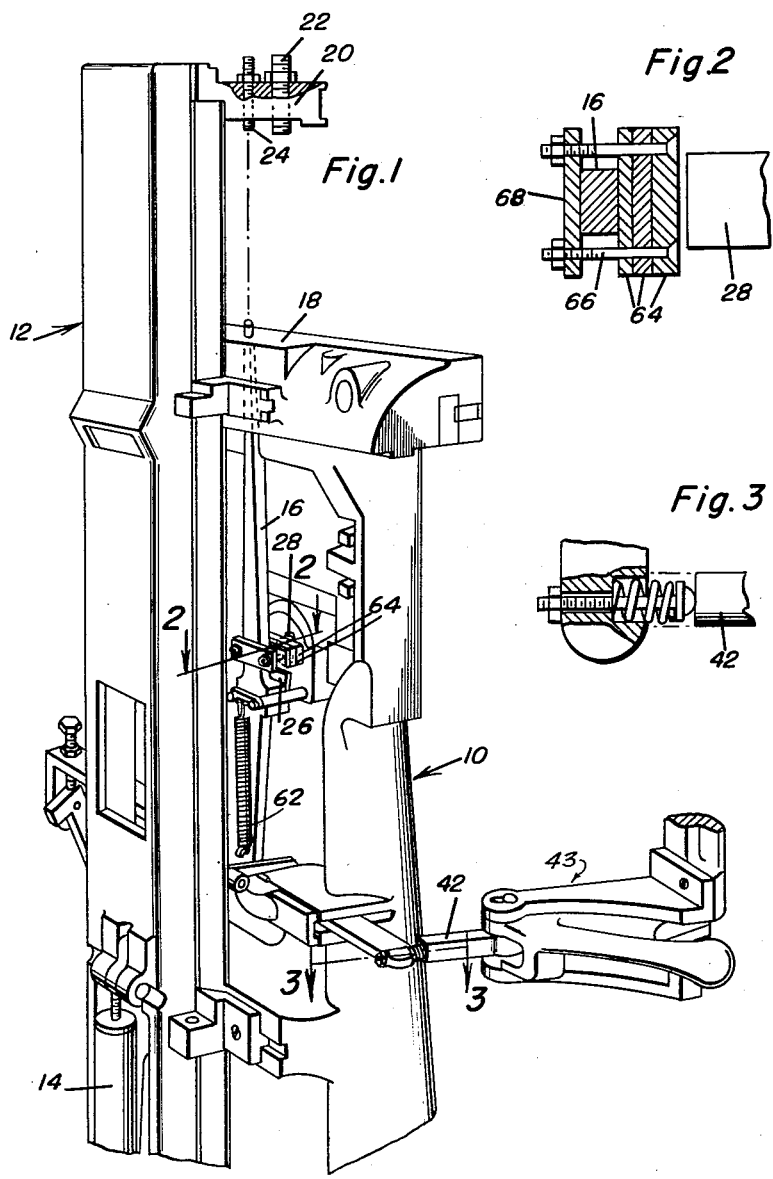
Charles W. Magnat, Jr.
INVENTOR.
BY *Clarence A. O'Brien*
*and Harvey B. Jacobson*
Attorneys

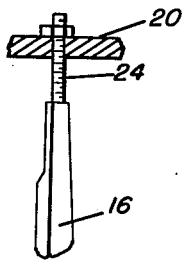
Fig.4
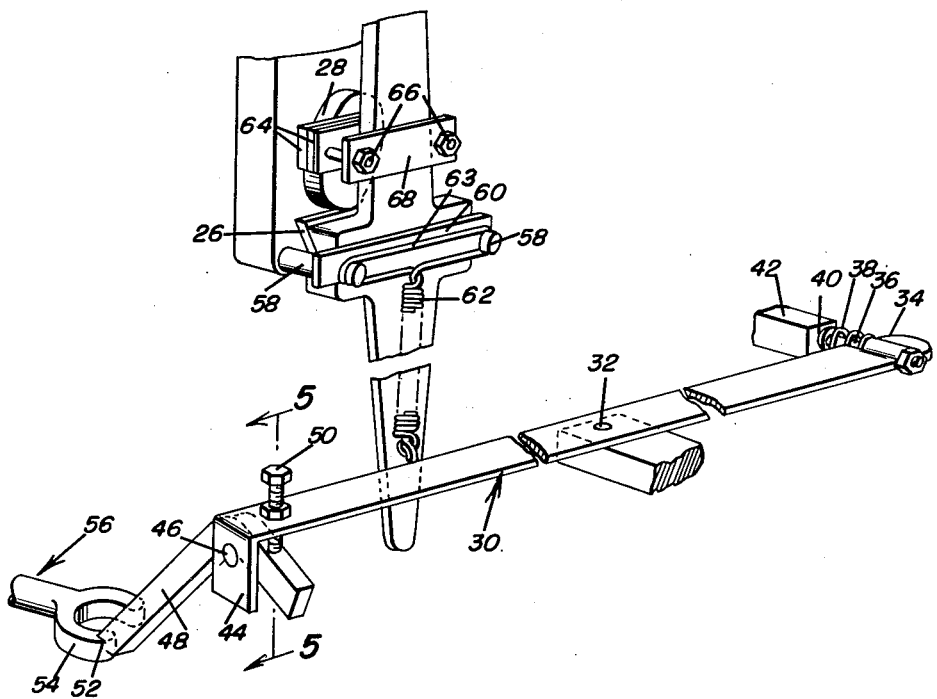
Fig.5
Charles W. Magnat, Jr.
INVENTOR.
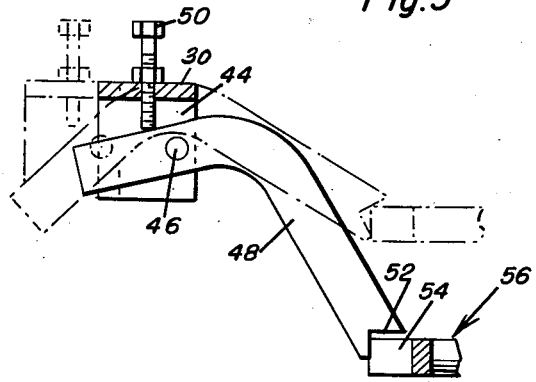

May 28, 1957 C. W. MAGNAT, JR 2,793,730
CLUTCH THROW-OUT MECHANISM
Filed Nov. 12, 1953 3 Sheets-Sheet 3
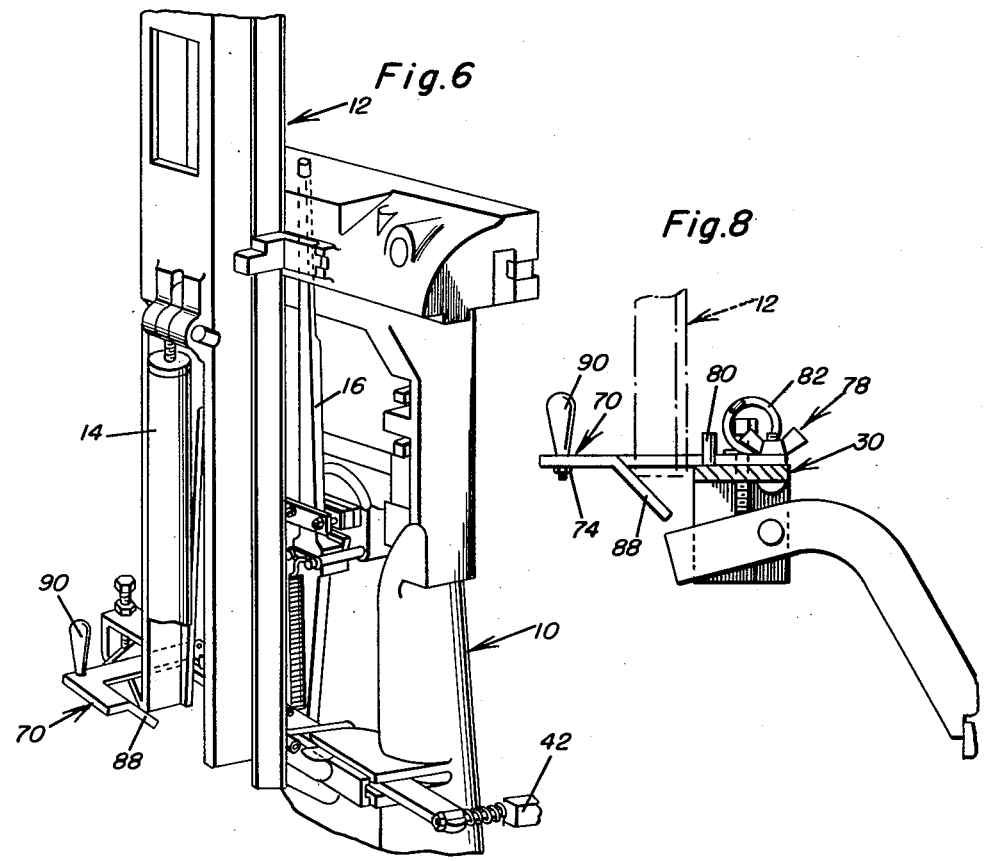
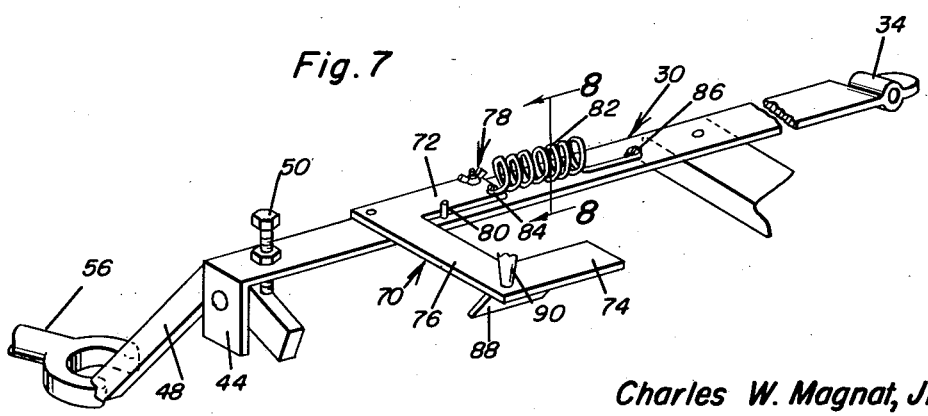
Charles W. Magnat, Jr.
INVENTOR.

United States Patent Office 2,793,730
Patented May 28, 1957

2,793,730
CLUTCH THROW-OUT MECHANISM
Charles W. Magnat, Jr., Bergenfield, N. J.

Application November 12, 1953, Serial No. 391,400

14 Claims. (Cl. 192—125)

This invention relates to improvements in Linotype machines of the character disclosed in the patent to Mergenthaler, No. 436,532, and pertains more specifically to improvements in safety mechanism therefor.

A primary object of this invention is to provide an improved form of safety clutch throw-out lever and associated means to prevent damage to matrices due to misalignment of the matrices with a casting mold slot or other malfunctioning in regard to alignment of the matrices and a mold slot, wherein such misalignment might give rise to an escape of the "squirting" molten metal from the heating pot and accordingly endangering the operator of the machine as well as damaging the machine per se.

Another object of this invention is to provide safety mechanism in accordance with the preceding object which is utilized in lieu of the conventional clutch throw-out lever for the main drive of a Linotype machine and which may be installed very quickly as a complete operating assembly in existing machines.

The prior art discloses in Linotype machines of the character involved in this invention, various safety expedients incorporated therewith for interrupting the main drive of the machine. As shown, for example, by the patent to Bertram, No. 1,194,937, is a manually operated de-clutching mechanism for the main drive of such machine and by the patent to Kennedy No. 975,434, an automatic de-clutching mechanism for the main drive during occurrence of misalignment of the matrices with the mold slot. It is the further object of invention to provide safety mechanism in a Linotype machine ensuring maximum efficiency in operation and reducing to a minimum, the dangers to the operator and machine parts due to misalignment of the matrices with a mold slot during operation.

Still a further object of this invention is to incorporate with structure providing the objects set forth above means for operating therewith to be used when special matrices are used in a standard magazine of a Linotype machine, wherein such structure prevents the distribution of said special matrices to the standard magazine of such a Linotype machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a portion of a Linotype machine showing the first elevator and vise automatic;

Figure 2 is an enlarged vertical section taken substantially along the plane of section line 2—2 in Figure 1;

Figure 3 is an enlarged sectional view taken along the plane of section line 3—3 in Figure 1;

Figure 4 is an enlarged perspective view with portions broken away or in section showing the improved clutch throw-out mechanism;

Figure 5 is an enlarged section taken substantially along section line 5—5 in Figure 4;

Figure 6 is a view similar to Figure 1 but showing a modified form of the invention;

Figure 7 is an enlarged perspective view of the modified mechanism illustrated in Figure 6; and Figure 8 is a transverse section taken generally along the plane of section line 8—8 in Figure 7.

The terminology used in this application is that typical in the art, with further explanation and description relative thereto being available in "Linotype Machine Principals" by Mergenthaler Linotype Company, Brooklyn, New York, said publication being well known to those skilled in the art.

Referring now more particularly to Figure 1, reference numeral 10 indicates a portion of the vise automatic frame generally while reference numeral 12 indicates the first elevator slide. The first elevator slide is mounted on the frame for guided vertical movement thereon, this movement being imparted thereto by means of the link member 14 attached at its lower end to the first elevator lever (not shown) operated by the conventional cam mechanism.

A usual automatic stop rod, similar to that shown by Patent No. 975,434, is indicated by the reference character 16, the upper end of this rod normally projecting above the frame portion 18 in which it is slidably received. The first elevator 20 carries the usual center stop screw 22 as well as the screw 24, the latter of which is in vertical registry with the upper end of the automatic stop rod. As is conventional, upon movement of the first elevator to the lower position, the screw 24 will force the automatic stop rod downwardly such that the safety pawl 26 is positioned slightly below the lower lip of a "vise automatic" mold disk dog 28 permitting this pawl to be cleared by the mold disk dog as the same is moved in response to movement of the mold disk toward the vise automatic for subsequent casting operation.

Reference numeral 30 indicates generally an improved form of clutch throw-out lever which is pivoted to the frame as by a suitable pin 32, reference being had in this respect more particularly to Figure 4 of the drawings. The right hand end of the clutch lever is provided with a boss 34 slidably receiving an adjusting screw 36, this screw being normally urged by spring 38 into a position such that its headed end 40 engages a cam shaft clutch control rod 42, thus normally positioning the lever 30, the lever 30 being operably associated with a hand lever stopping assembly 43, similar to that shown in Patent No. 1,194,937, such that its left hand end is swung rearwardly. This end of the lever has a depending ear portion 44 carrying a pin 46 to which an angular force transmitting element 48 is pivoted. The forward end of the element 48 is engaged by an adjusting screw 50 secured to lever 30 and an opposite or rearward end of the arm is notched, as at 52, so that it may engage with a toe 54 of "justification lever" 56 when the left hand end of the lever is swung rearwardly as shown most clearly in Figure 5.

The lower end of the automatic stop rod 16 passes between posts 58 carried by a "vise automatic" frame as well as between the frame proper and a cover strap 60, in the manner shown. Spring 62 has an upper eye portion 63 looped about posts 58 to retain strap 60 in place and provide an anchor for the spring. The opposite end of the spring is connected to the lower end of the automatic stop rod to urge the same upwardly in a conventional manner. Under action of the previously described spring 38, the throw-out lever 30 lightly engages against the lower end of the automatic stop rod while the rear end of the force transmitting element 48 is simultaneously disposed in the path of movement of the toe 54 of "justification lever" 56.

As seen most clearly in Figure 4, a series of shim plates 64 are secured to the rear face of the stop rod 16 by means of suitable fasteners 66 and a clamping strap 68. These shims are positioned on the stop rod at such a point that they are in the path of movement of the upper part of the mold disk dog 28 when the stop rod is in the lowered position shown, that is, when the first elevator is in the lower position and the pawl 26 clears the lip of the advancing mold disk dog. If the matrices in the vise are properly positioned such that a normal casting operation may take place, the mold disk dog will advance in the usual manner, against the shims to shift the stop rod forwardly and consequently pivot the lever 30 about pin 32 to shift member 36 against the compression of spring 38 until the rear longitudinal edge of the throw-out lever engages the forward end of clutch control rod 42. In this position of the throw-out lever, the notched end of the force transmitting element 48 is clear of the toe 54 of the rising "justification lever" 56, allowing further operation of the machine.

As is well understood in this art and clearly shown in the publication "Linotype Machine Principals", if one or more matrices in the vise are positioned to prevent misalignment of the matrices with the casting mold slot, due to an error on the operator's part or malfunctioning of the portions of the machine relating to the matrices during this operation, when a mold disk advances toward a vise prior to the casting operation, the advancing mold lip may strike the ear at the lower corner of the matrix or matrices in error. This will not only damage the matrices when the metal pot is subsequently engaged against the mold disk, but will also prevent the mold disk from properly engaging with a line of matrices so that molten metal will squirt from the machine, presenting a hazard to the operator or other persons.

In this position, that is, if one or more of the matrices in the vise are out of position through error on the operator's part or otherwise, the mold disk dog 28 will not be permitted to advance the proper distance so that the throw-out lever 30 is not pivoted to the position wherein the force transmitting element 48 clears the top of the upwardly moving "justification lever" 56. In other words, the assembly will remain in the position shown most clearly in Figure 5. Thus, when the "justification lever" 56 engages the force transmitting element 48 in its upward movement, it will pivot this arm about the pin 46 and force the left hand end of the throw-out lever 30 forwardly in the manner indicated by the dotted lines in Figure 5. Of course, this will effect rearward movement of the control rod 42 and consequent disengagement of the cam shaft clutch to stop further operation of the machine before the casting operation is started, see for example Patent No. 1,194,937. It will be understood that the usual operation of the pawl 26, being positioned in the path of movement of the mold disk dog 28 should the first elevator fail to be lowered completely, to effect pivoting of the throw-out lever 30 and disengagement of the clutch under these circumstances, is not affected, the operation being the same as when the machine is provided with the shorter throw-out lever conventionally used. Moreover, it is to be understood that the throw-out lever 30 replaces the conventional throw-out lever and requires no modification or alteration of machines in the field other than the removal of the existing throw-out lever and replacement of the same with the throw-out lever above described.

It will be evident that the over-all thickness of the shim plates 64 will be adjusted such that the safety feature operates properly, their thickness being generally of the nature to impart approximately ⅛" movement to the clutch control rod end of the throw-out lever when the mold disk dog is advanced fully.

As a practical consideration, it is to be observed that the above described assembly is extremely more sensitive than existing mechanisms which intend to accomplish the same purpose. Whereas conventional mechanisms such as that of Patent No. 975,434 require several individual matrices (usually a combined thickness of approximately 1") to be in error before the clutch will be thrown out, the above described device will effectively operate to disengage the clutch even though only a single thin matrix is involved. Thus, it will be seen that this mechanism will save considerable time and expense, particularly when it is realized that Linotype operators normally set a very large number of tight lines in the course of normal operation, this practice being largely responsible for the great number of matrices damaged and destroyed and which the herein described mechanism will obviate.

Referring now more particularly to Figures 6-8 wherein a modified form of the throw-out lever assembly is shown, it will be noted that in addition to the previously described force transmitting element 48, the throw-out lever 30 has a detent mechanism indicated generally by the reference character 70 secured thereto. This mechanism is in form of a generally U-shaped plate presenting the spaced leg members 72 and 74 interconnected by a bight portion 76. One leg 72 is pivotally secured by a wing nut and bolt assembly 78 to the lever 30, and the inner edge of this leg is normally urged against a stop pin 80 by the action of a tension spring 82, this spring being secured at its opposite ends to fasteners 84 and 86 carried by the leg 72 and throw-out lever 30, respectively, in the manner shown.

The detent mechanism is intended for use only under those circumstances in which complicated lines are set with different matrices which are not to be distributed through or to the usual magazines. Normally, the detent will be swung to the left in Figures 6 and 7 and the wing nut assembly tightened such that the ear 88 is out of the path of movement of a first elevator and is not affected thereby. When, however, lines are set with different matrices, such as when setting full page food ads where small "ten point" is used with large "24 point" matrices, the operator will loosen the wing nut so that the spring 82 will swing the detent to the position shown in Figures 6 and 7. Then, the angularly depending ear 88, partially underlying the foot of a first elevator slide 12 when the same is in its uppermost position, will cause the detent mechanism to swing lever 30 to the clutch throw-out position upon downward movement of the first elevator. This will stop the operation of the machine just after the transfer of matrices from the first to second elevators and before "distribution," and will permit the operator to strip the special matrices from the second elevator.

It is to be understood that the above described detent assembly is designed to obviate accidental distribution of special matrices to the standard magazine of a Linotype machine. During conventional operation, it is necessary for the operator to manipulate the clutch throw-out lever 43 in order to stop the first and second elevators just after transfer of the matrices between them is accomplished. With the instant device, the operator merely loosens the wing nut at some time just prior to the transfer operation and the detent assembly will automatically release the clutch at the proper time. Also, by the herein described mechanism, the position of the first and second elevators is always the same when the clutch is thrown out, this being capable, by adjustment, of control so that the second elevator is best positioned for the removal of the special matrices.

The various typical terms relating to the conventional Linotype machine involved in this invention such as matrices, first and second elevators, vise, vise automatic, etc. are those well known and old in the art, this structure being typical to that disclosed in the early Mergenthaler Patent No. 436,532 or that disclosed and described in "Linotype Machine Principals" by the Mergenthaler Linotype Company of Brooklyn, New York, which were previously mentioned in the specification and are well known to those skilled in the art.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a Linotype machine having a frame, a cam shaft clutch control rod, a laterally movable automatic stop rod and a justification lever, the improvement comprising: a Linotype clutch throw-out mechanism including a throw-out lever including two ends and adapted to be pivotally secured adjacent its midportion to the frame of a Linotype machine with one end disposed adjacent the cam shaft clutch control rod thereof and with an intermediate portion, beyond the pivotal connection and toward the other end, disposed adjacent and in the path of lateral movement of the automatic stop rod of the Linotype machine, a force transmitting element pivoted to said other end of the lever and having a portion depending in inclined relation thereto to terminate in an end portion for movement between a first position in the path of movement of the justification lever of the machine and a second position out of the path of movement thereof.

2. The combination of claim 1 wherein the Linotype machine also has an elevator slide provided with a foot, a detent assembly pivotally secured to said lever adjacent said other end, said assembly including an ear portion selectively movable into and out of the path of movement of said foot of said elevator slide.

3. In combination with a Linotype machine having a frame, a first elevator vertically slidably carried by the frame, a cam shaft clutch control rod position on the frame to one side of the first elevator, a justification lever positioned on the frame to the other side of the first elevator, an automatic stop rod having a safety pawl and carried by the frame between the control rod and justification lever, and a mold disk dog behind the justification lever; a clutch throw-out lever pivotally secured adjacent its midportion to said frame, the point of pivotal securement being to the said one side of the frame and between the automatic stop rod and the clutch control rod, said lever having one end portion disposed closely adjacent said clutch control rod and another end portion disposed adjacent said justification lever, a force transmitting element pivotally carried by the other end portion of the lever including an end disposed closely adjacent the justification lever, shim means secured to said automatic stop rod above the safety pawl thereof, and resilient means positioned between the said one end of the lever and said clutch control rod for normally positioning said end of the force transmitting element in the path of vertical movement of the justification lever.

4. The combination of claim 3 wherein said other end of the lever is bent downwardly and a pivot pin, passing therethrough, establishes the pivotal connection to said force transmitting element.

5. The combination of claim 3 wherein said other end of the lever is bent downwardly and a pivot pin, passing therethrough, establishes a pivotal connection to said force transmitting element, said force transmitting element having an opposite end portion underlying said lever, and an abutment member secured to said lever and projecting therebelow into engagement with said opposite end portion of the force transmitting element.

6. The combination of claim 5 wherein said abutment member is adjustably secured to said lever whereby the opposite end of the force transmitting element is movable toward and away from the undersurface of the lever.

7. The combination of claim 3 wherein said resilient means comprises a plunger element slidably carried by the said one end of the lever and a spring urging the free end of the plunger into engagement with the clutch control rod.

8. The combination of claim 3 wherein said other end of the lever is bent downwardly and a pivot pin, passing therethrough, establishes a pivotal connection to said force transmitting element, said resilient means comprising a plunger element slidably carried by the said one end of the lever and a spring urging the free end of the plunger into engagement with the clutch control rod.

9. The combination of claim 3 wherein said other end of the lever is bent downwardly and a pivot pin, passing therethrough, establishes the pivotal connection to said force transmitting element, said force transmitting element having an opposite end portion underlying said lever, and an abutment member secured to said lever and projecting therebelow into engagement with said opposite end portion of the force transmitting element, said resilient means comprising a plunger element slidably carried by the said one end of the lever and a spring urging the free end of the plunger into engagement with the clutch control rod.

10. The combination of claim 5 wherein said abutment member is adjustably secured to said lever whereby the opposite end of the force transmitting element is movable toward and away from the undersurface of the lever, said resilient means comprising a plunger element slidably carried by the said one end of the lever and a spring urging the free end of the plunger into engagement with the clutch control rod.

11. The combination of claim 3 wherein there is a first elevator slide having a foot and in which said first elevator is disposed, a detent assembly is pivotally secured to said lever adjacent said other end, said assembly including an ear portion selectively movable into and out of the path of movement of said foot of said first elevator slide.

12. The combination of claim 3 wherein there is a first elevator slide having a foot and in which said first elevator is disposed, a detent assembly pivotally secured to said lever adjacent said other end, said assembly comprising a generally U-shaped plate having spaced parallel legs interconnected by a bight portion, one leg being pivotally secured at its free end to said lever, the other leg having a downwardly inclined ear projecting from its inner edge, spring means normally urging said assembly to a position on the lever such that said ear is disposed beneath the foot of the first elevator slide when the same is in its uppermost position, and a stop pin on said lever for engaging said one leg and holding the stated position of the ear.

13. A clutch throw-out mechanism for Linotype machines comprising an elongated lever, a plunger projecting laterally from one end of said lever, spring means operably connected to said plunger for normally urging said plunger to a projected position, a downturned ear at the other end of said lever, an angulated force transmitting element pivotally secured to said ear including a first arm underlying said lever and a second arm projecting therefrom in downwardly inclined relation, and adjustable abutment means on said lever for engagement with said first arm of the force transmitting element.

14. The mechanism as defined in claim 13 wherein a detent assembly is pivotally secured to said lever adjacent said other end, said assembly comprising a generally U-shaped plate having spaced parallel legs interconnected by a bight portion, one leg being pivotally secured at its free end to said lever, the other leg having a downwardly inclined ear projecting from its inner edge, a stop pin on said lever, and spring means normally urging said assembly to a position on the lever wherein said one leg engages said pin.

References Cited in the file of this patent
UNITED STATES PATENTS

| | | |
|---|---|---|
| 1,529,903 | Mojonnier et al. | Mar. 17, 1925 |
| 1,813,811 | Molins | July 7, 1931 |
| 2,743,620 | Schwarz et al. | May 1, 1956 |